United States Patent
Tanskanen

(12) 
(10) Patent No.: US 6,817,947 B2
(45) Date of Patent: Nov. 16, 2004

(54) MULTI-PLAYER GAME SYSTEM

(75) Inventor: Erkki Tanskanen, Luhtipolku (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/401,664

(22) Filed: Mar. 28, 2003

(65) Prior Publication Data

US 2003/0190957 A1 Oct. 9, 2003

Related U.S. Application Data

(62) Division of application No. 09/460,340, filed on Dec. 10, 1999, now Pat. No. 6,579,184.

(51) Int. Cl.$^7$ ................................................. A63F 9/24
(52) U.S. Cl. ........................................................ 463/41
(58) Field of Search .............................. 463/40–42, 30, 463/31

(56) References Cited

U.S. PATENT DOCUMENTS

| | | |
|---|---|---|
| 4,572,509 A | 2/1986 | Sitrick |
| 4,586,707 A | 5/1986 | McNeight et al. |
| 4,592,546 A | 6/1986 | Fascenda et al. |
| 4,926,327 A | 5/1990 | Sidley |
| 5,051,822 A | 9/1991 | Rhoades |
| 5,083,800 A | 1/1992 | Lockton |
| 5,213,337 A | 5/1993 | Sherman |
| 5,236,199 A | 8/1993 | Thompson, Jr. |
| 5,397,133 A | 3/1995 | Penzias |
| 5,488,412 A | 1/1996 | Majeti et al. |
| 5,538,255 A | 7/1996 | Barker |
| 5,539,449 A | 7/1996 | Blahut et al. |
| 5,545,088 A | 8/1996 | Kravitz |
| 5,558,339 A | 9/1996 | Perlman |
| 5,570,126 A | 10/1996 | Blahut et al. |
| 5,581,270 A | 12/1996 | Smith et al. |
| 5,592,212 A | 1/1997 | Handelman |
| 5,641,319 A | 6/1997 | Stoel et al. |
| 5,643,088 A | 7/1997 | Vaughn et al. |
| 5,685,775 A | 11/1997 | Bakoglu et al. |
| 5,904,620 A | 5/1999 | Kujawa |
| 5,956,485 A | 9/1999 | Perlman |
| 5,961,386 A | 10/1999 | Sawaguchi |
| 5,984,787 A | 11/1999 | Redpath |
| 6,080,064 A | 6/2000 | Pieterse et al. |
| 6,165,069 A | 12/2000 | Sines et al. |
| 6,217,447 B1 | 4/2001 | Lofink et al. |
| 6,241,612 B1 | 6/2001 | Heredia |
| 6,352,479 B1 | 3/2002 | Sparks, II |

FOREIGN PATENT DOCUMENTS

| | | |
|---|---|---|
| GB | 2120507 | 11/1983 |
| WO | WO 99/42964 | 8/1999 |

*Primary Examiner*—Michael O'Neill
(74) *Attorney, Agent, or Firm*—Steven A. Shaw; Arjun Krishnan

(57) ABSTRACT

A multi-player video game server includes a player control interface, a video interface, and a game engine. The player interface couples the game server to a network and can receive game control data over the network from multiple players. Each player has a game control device at which game control data can be input. The video interface couples the game server to a video transmission network and transmits game display video over the video transmission network. The game engine is coupled to the player interface and the video interface and includes a processor and a memory. The memory stores multi-player video game instructions that configure the processor to process game control data and render the game display video that is then provided to the video interface for transmission over a video network. A multi-player video gaming method includes receiving a number of player input data connections at a game server. Each of the game control data stream includes player input data from a different player of a multi-player video game. An output display image is generated at the game server by executing video game instructions to process the player input data connections from the multiple players as inputs to the same multi-player game. The output display image is then transmitted over a channel of a video transmission network.

10 Claims, 4 Drawing Sheets

MULTI-PLAYER GAME SYSTEM

This application is a Divisional of and claims priority under 35 U.S.C. 120 to U.S. Ser. No. 09/460,340; filed on Dec. 10, 1999, now U.S. Pat. No. 6,579,184.

BACKGROUND OF THE INVENTION

Video game are a popular entertainment activity that players can engage in through the use of a dedicated video game console or a personal computer. Game consoles and personal computers can be used to receive input from an attached game pad, keyboard, joystick or other game controller, process video game software, and display video game images on a connected television or monitor. Video game consoles and personal computers also can be used for multi-player games. Multi-player games typically require each player to use different game controllers attached to the same game console or computer. Multi-player game systems can also be implemented using game consoles or computers that send data to each other over a network or modem connection. In these multi-player systems, each of the multiple players are required to have compatible local video game consoles and/or home computer, and local copies of particular game software to play games with each other. Multi-player video games may, however, be more conveniently provided to players by a system in which the players do not require local game consoles, home computers, or other specialized devices.

SUMMARY OF THE INVENTION

In general, in one aspect, the invention features a multi-player video game server. The video game server includes a player interface, a video interface, and a game engine. The player interface couples the game server to a network and can receive game control data over the network from multiple players. Each player has a game control device used to input game control data. The video interface couples the game server to a video transmission network and transmits game display video over the video transmission network. The game engine is coupled to the player interface and the video interface and includes a processor and a memory. The memory stores multi-player video game instructions that configure the processor to process game control data and render the game display video that is then provided to the video interface for transmission over a video network.

In general, in another aspect, the invention features a multi-player video gaming method. The method includes receiving a number of player input data connections at a game server. Each of the game control data stream includes player input data from a different player of a multi-player video game. An output display image is generated at the game server by executing video game instructions to process the player input data connections from the multiple players as inputs to the same multi-player game. The output display image is then transmitted over a channel of a video transmission network.

In general, in another aspect, the invention features a method for providing a multi-player video game. The method includes receiving player input data at a game control device and transmitting the player input data over a network to a game server. The method also includes receiving a video game image at a video terminal that was generated at the game server in response to the player input data from the game control device and player input data from another game control device.

Implementations may include one or more of the following features. The output display image (i.e., the game display video image) may be divided into different subdivisions each of which is associated with a different one of the players. The player input data may be touch-tone (i.e., dual-tone multi-frequency (DTMF)) data that is input by the players using telephone keypads. The transmitted output display image may be receivable by both players and an audience of non-players. The same output display image may be sent to all players of the multi-player game, or the game engine may generate different output display images for different players; the different output display images may be transmitted over different channels of the video transmission network. The game server may support more than one multi-player game (i.e., the game server may receive player input data connections from a second group of players and send output display images to that second group that are generated based on the game control data received from those players). The video game instructions for different multi-player games may be executing at different game engines. The game engines may include commercially available (mass-market) video game hardware such as Sony Playstation®, Nintendo® or Sega® video game hardware. The game control streams may be received over a network that is different from the video transmission network. For example, the game control streams may be received over a point-to-point telephone network or a packet data network, while the video may received over a broadcast video network. The video transmission network may be a one-way video transmission network that can transmit video on multiple channels, and each channel may be receivable at multiple display terminals.

The details of one or more embodiments of the invention are set forth in the accompanying drawings and the description below. Other features, objects, and advantages of the invention will be apparent from the description and drawings, and from the claims.

DETAILED DESCRIPTION OF THE INVENTION

Figure 1:
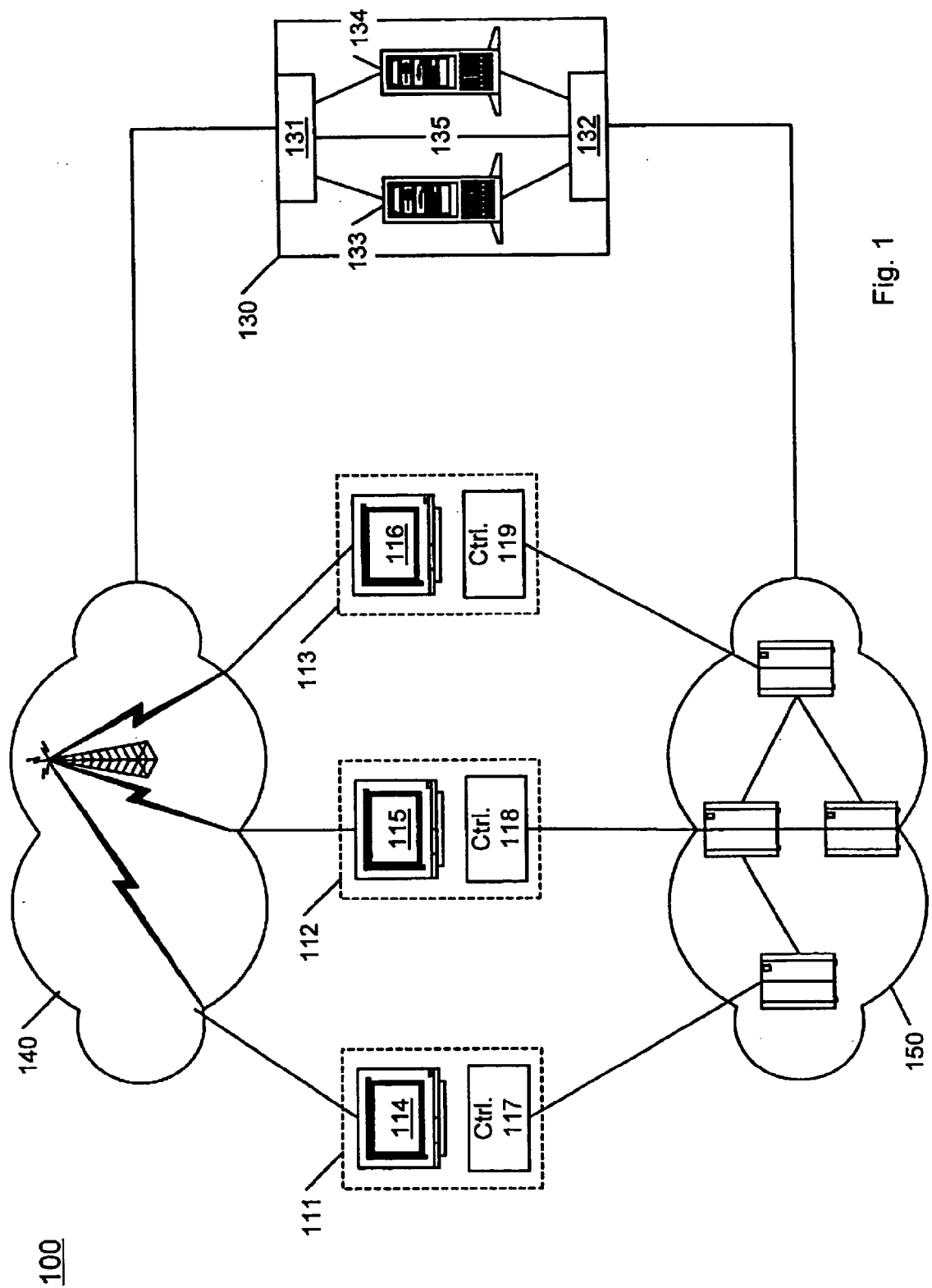
FIG. 1 is a block diagram of a video game system.

FIG. 1 shows a system 100 for multi-player video games. The system lets players take part in multi-player video games using gaming equipment 111–113 that includes a game controller 117–119 and a television or other video display terminal 114–116. The controllers 111–113 and display terminals 114–116 are coupled, respectively, over a data network 150 and a video transmission 140 network to a video game server 130. The video game server processes data from the controllers ("player input data") and generates video game images that are viewed by the players.

To communicate player input data to the server 130, data connections are established through network 150 between the controllers 117–119 and the game server 130. The way in which the data connections are established will depend on the type of controller 117–119, network 150, and server 130 technology implemented in the system 100.

Figure 4:
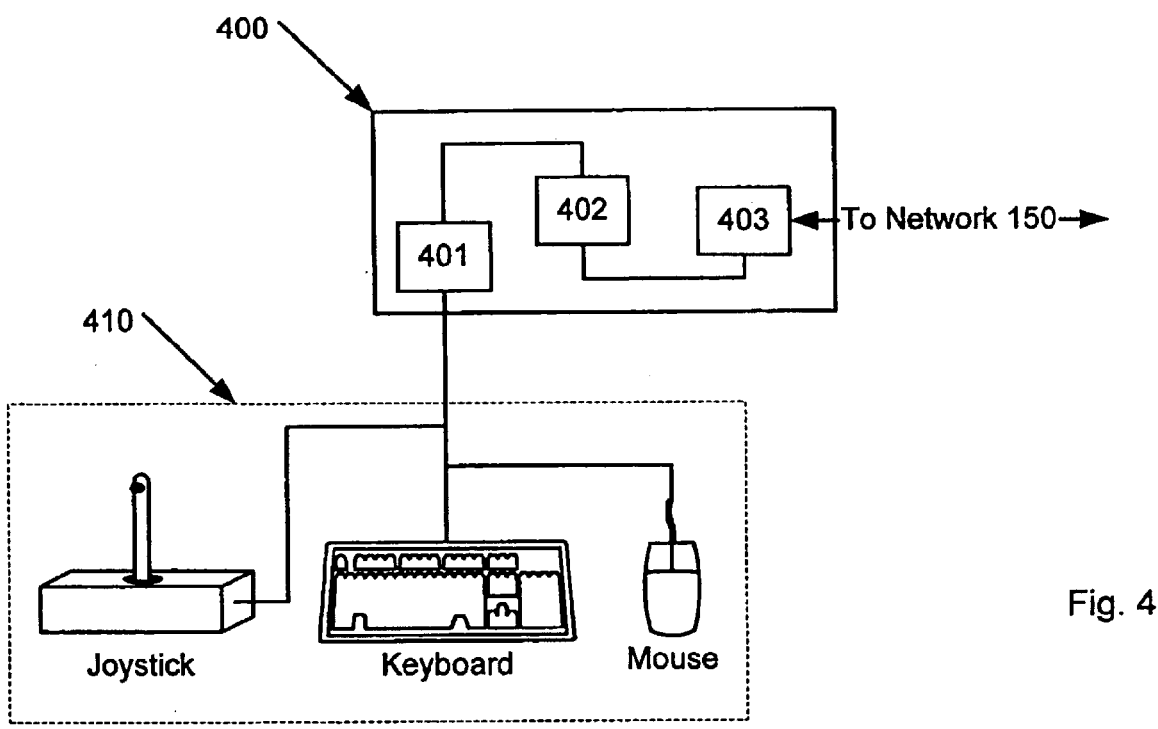
FIG. 4 is a block diagram of a game controller network interface.

In a telephone handset controlled system, the controllers 117–119 can include telephone handsets that transmit touch-tone signals (i.e., dual-tone multi-frequency (DTMF)

signals) through a voice phone network 150 to a telephone network interface 132 at the game server. Players can control a game from a telephone handset by entering digits on the telephone's keypad. In some implementations, the game server also may send synthesized voice or other sounds back to the players by means of their telephone handsets. For example, interface 132 may include voice synthesis circuitry to communicate operating instructions to players. Other types of controllers (e.g., joysticks, game pads, keyboards, and mice) also can be constructed with analog telephone interface circuitry enabling them to send DTMF signals over a phone network. For example, referring to FIG. 4, a joystick, keyboard, mouse and/or other controller 410 can be coupled to analog telephone interface circuitry 400. The analog telephone interface circuitry 400 can include circuitry 401 to map controller 410 inputs onto one or more telephone keypad symbols (0–9, ***, and #), circuitry 402 to generate DTMF tones, and circuitry 403 providing an electrical interface to an analog telephone network 150. Thus, different inputs from a controller 410 can activate DTMF tone generation circuitry 402 in much the say way as telephone keypad buttons close switches to activate DTMF tone generation circuitry. Implementations also can use controllers 117–119 that communicate by sending binary data over network 150. In a digital controller implementation, circuitry 401–403 can be replaced by interface 401 to the controller(s) 410, a microcontroller or other programmable processor 402 and a modem or other network interface 403. For example, a game controller may send digital data to the game server 130 using a modem 403 to communicate through a telephone network 150. Interface 403 also can be a digital subscriber line interface to connect to a packet-based network such as the Internet or another digital connections (e.g., Ethernet, token ring, IEEE 802.11). Circuitry 400 and controller(s) 410** can be implemented using a personal computer with a connected input device and network connection.

Figure 2:
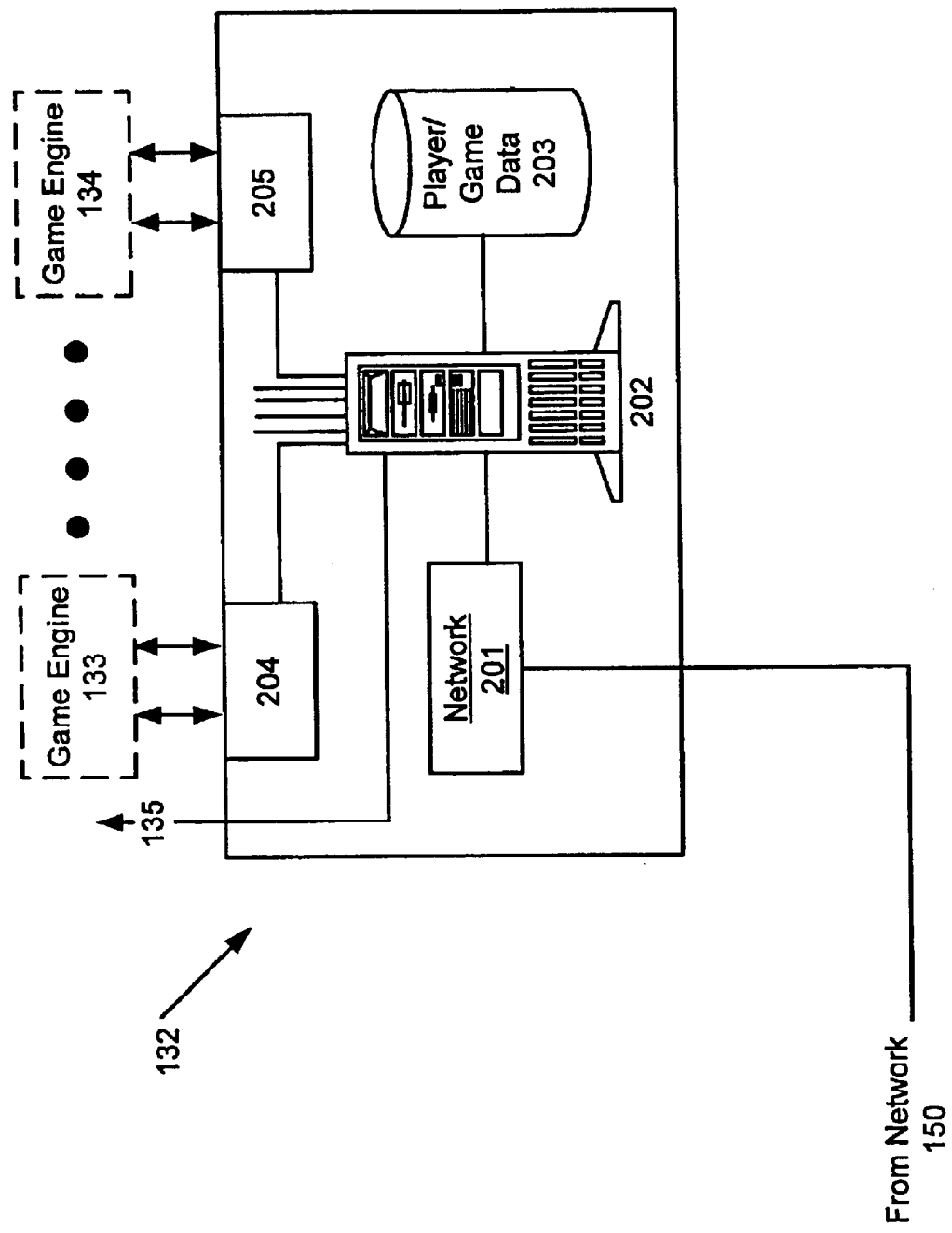
FIG. 2 is a block diagram of a game control data interface.

Player input data (i.e., data derived from player input at controllers 117–118) is sent through the network 150 to a player data interface 132 at the game server 130. Different types of data interfaces 132 can be used depending on the controller 117–119 and network 150 technology used in a game system 100. FIG. 2 shows additional details of a player data interface 132. The interface 132 includes network interface circuitry 201 that terminates communication signals from the network 150. In game systems 100 in which the network 150 is a analog phone network, the interface 201 may be a modem bank with a telephone network twisted wire pair or trunk interface (e.g., a T1 trunk interface). A modem bank can include circuitry that provides for both DTMF signal detection and the demodulation of binary data from another modem. Thus, a modem bank based interface 201 may be used to detect DTMF signals from DTMF-based controllers (e.g., analog telephone handsets) and binary data from controllers 117–119 that communicate digitized data using a modem. Interface 201 also can be a digital interface to a packet-based network 150. For example, interface 201 can be a router connecting server 130 to the Internet or to a local area network 150.

Prior to sending player input data through the network 150, a data connection is established between a player's controller 117–119 and the interface 132. In the case of an interface 132 connected to a voice telephone network 150, a data connection may be established by dialing a telephone number assigned to the interface 132. In the case of packet-based networks 150, the data connection may be established using an network address of the interface 132 in a data frame header. After a player input data connections is established, player input data from that connection is associated with a game engine 133–134 and routed to that game engine by the interface 132. Note that, although FIG. 1 shows two game engines 133–134, implementations may use additional game engines or may use a single game engine. As further described below, each game engine 133–134 executes video game software instructions and receives player input data from the multiple participants of a particular game.

Servers 130 may offer different types of games (e.g., chess, checkers, or cards) or may offer only a single game type (e.g., a checkers-only server). If a server 130 offers multiple game types, a player may select a desired game type before that player's input data is associated with a particular game engine. To select a game type, the player may be prompted by a synthesized voice sent to a telephone handset controller 117–119 from interface 132 or by a display on a video terminal 114–116. The prompt can indicate that a numeric code should be entered or that a joystick or other controller 410 should be used to select a game type. For example, a synthesized voice may announce "Enter '1' key to play chess, '2' to play checkers, and '3' to play cards" and/or the player's video display 114–116 may indicate that a joystick should be moved up to play chess, left to play checkers and right to play cards. In the case of a single game type server 130, selection of the game type can be by default.

Once a game type has been selected (by the player or by default), the player may be assigned to a game engine 133–134 based on the available capacity of the game engines and/or on the availability of other game participants. Players may be assigned to a game engine using information in a database 203. For example, database 203 may contain records identifying players and/or their input data connections, selected game type information for each player, and assigned game engine information for players that are assigned to game engines. As each player connects to the interface 132, the processor 202 can create a player record in the database 203 that identifies the player (and/or the player's data connection) and the type of game selected by that player. Players may be identified by system 130 login information such as a numeric password, by a received telephone number (e.g., via caller-ID functionality), by a network address, and/or by another network 150 connection identifier. The processor 202 can query the database 203 to determine if a game engine 133–134 is available for the selected game type and, for multi-player games, to determine if a sufficient number of additional players are waiting to play the selected game type. If there is an available game engine and there are sufficient players to play the selected game, the processor may assign the players (i.e., route their input data) to a particular game engine 133–134. If a game engine is not available, or additional players are needed for the selected game type, the player may be given the opportunity to wait for available players and or system capacity. If a player chooses to wait, a record is stored in the database 203 to indicate that the player is waiting. If the player does not want to wait, the player may be given the opportunity to select a different game type or to terminate the player input data connection to the server 130.

In some implementations, players may be able to select other players to play with. Selection may be based on skill levels or other information. For example, a chess player may "select" other players by entering a desired chess skill level (novice, intermediate, advanced) using controller 117–119 and the processor 202 may then match chess partners based on skill level data in the database 203. Skill levels data may be automatically generated and stored in player records in the database 203 based on previously played games, and/or players may be prompted to enter their skill level. Players also may be able to select other players using codes associated with a player group. For example, a player may enter a predetermined group identifier and the processor 202 may search database 203 for other players who have entered the same identifier. Players with matching group identifiers may be associated with the same game engine 133–134.

After a player has been associated with a game engine, that player's player input data is routed from the network interface 201 through a game engine interfaces 204–205 to that game engine 133–134. Game engine interfaces 204–205 can include software and/or hardware that electrically and logically formats the player input data from the controllers 117–119 into a game-engine-compatible format. Formatting of the player input data will depend on the game engine implementation. In some game servers 130, each game engine may be a separate software process executing on a single multi-tasking computer system. For example, the game engines 133–134 may be software processes executing on a server 130 running a Windows NT® or UNIX operating system, and game engine interfaces 204–205 may be software-implemented application programming interfaces between the game engine processes and other operating system processes. In other implementations, game engines 133–134 may be separate hardware devices. For example, each game engine 133–134 can be a consumer video game consoles, such as a Sony Playstation®, a Nintendo 64®, or a Sega Dreamcast® video game console. In such implementations, interfaces 204–205 include hardware ports to convert player input data signals received from the network 150 into signals that are compatible with the controller input ports on the video game consoles. For example, in a system using a Sony Playstation as a game engine, DTMF tones received from network 150 can be converted into electrical signals having the same electrical and logical format as would be produced by a Sony Playstation game pad.

Figure 5:
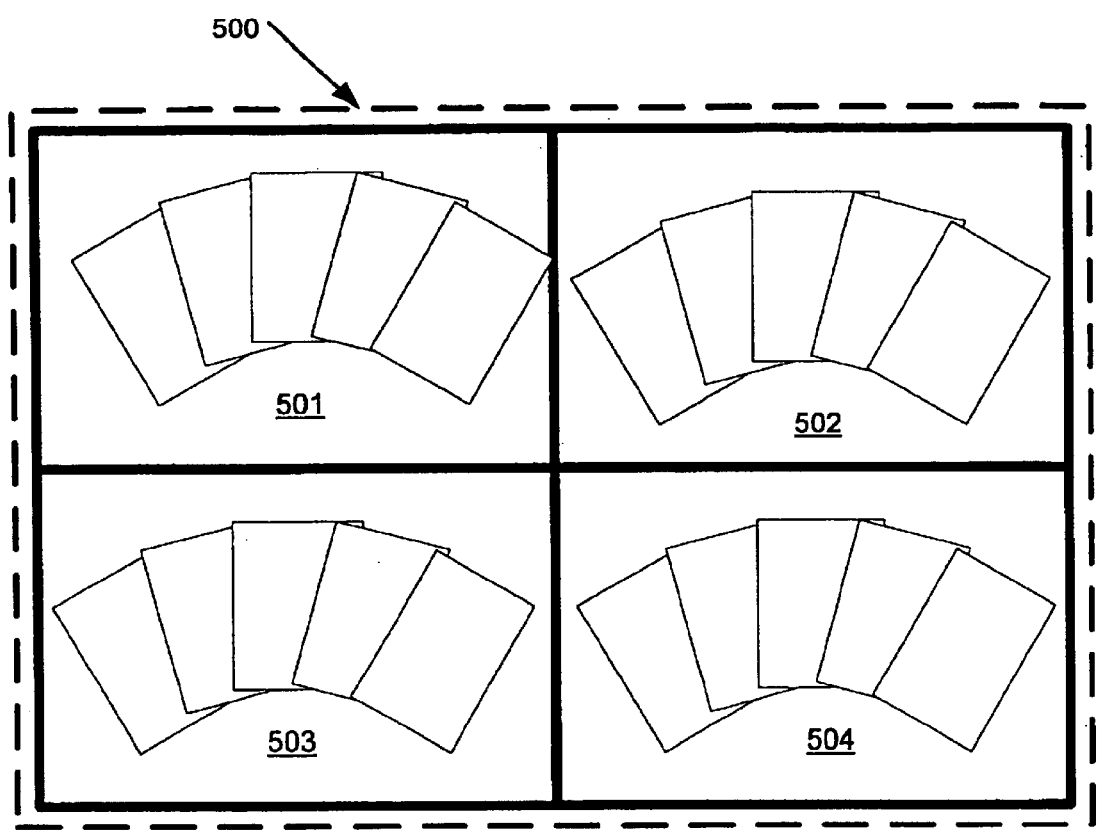
FIG. 5 is an output display having four quadrants.

Each game engine 133–134 produces one or more output video display signals. In a system 100 using television receivers 114–116, the video output signals can be PAL or NTSC television signals that are provided on a video output port of a video game console-based game engine, or by different video interface cards in a multi-tasking computer-based game engine. Different areas of the generated video output display image may be associated with different players of a multi-player game. For example, referring to FIG. 5, a 640 pixel by 480 pixel output image 500 can be subdivided into four simultaneously displayed 320 by 240 pixel quadrants 501–504, and different quadrant can be associated with different players. In a card game, three of the quadrants 501–503 may be used to display cards for three different players (one quadrant per player) and a fourth one of the quadrants 504 may display cards of a computerized opponent. Game engines 133–134 also may provide different video output images for each player. For example, each game engine can be a personal computers having four video display cards; each of the video display cards may generate a different video image that is associated with a different one of up to four players.

Figure 3:
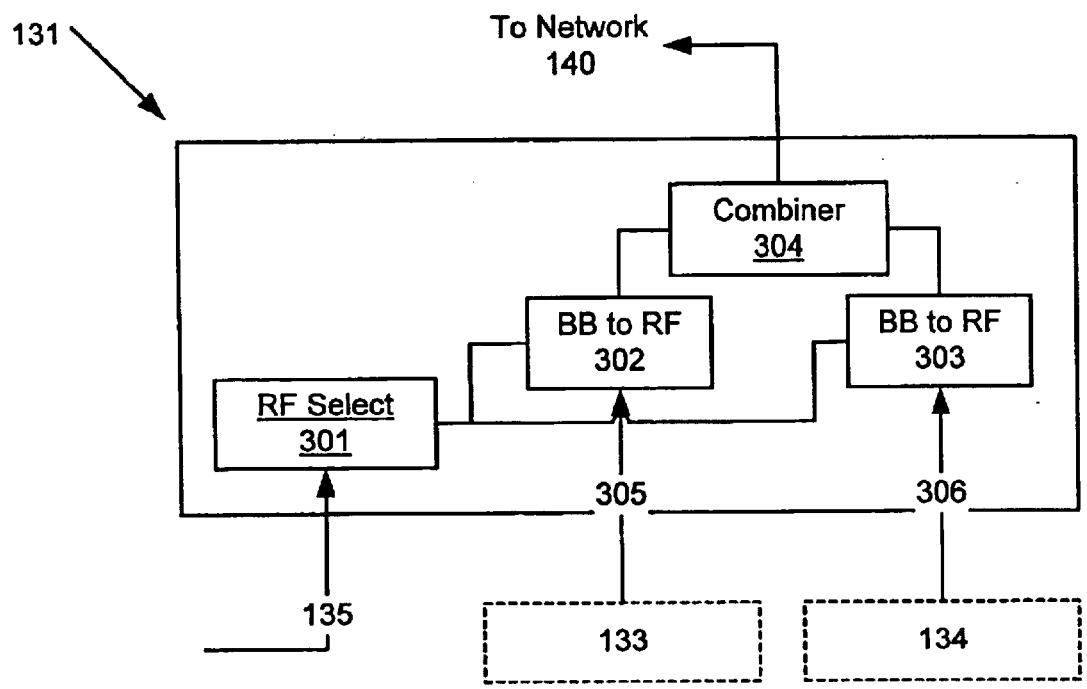
FIG. 3 is a block diagram of a video network interface.

Video images generated by game engines are provided to a video network interface 131 for transmission over a video transmission network 140. FIG. 3 shows details of an exemplary video network interface 131. The video interface 131 converts video output signals from the game engines into broadcast network 150 signals and provides the signals to the network 150. In a implementation using television receivers as displays 114–116, each one of the converted video signals can occupy a different television channel, and the different channel signals may be simultaneously transmitted over a cable TV, satellite, or terrestrial television broadcast network 140.

A television video interface 131 can include conversion circuitry 302–303 to convert base-band (BB) video signals 305–306 received from the game servers 133–134 into radio-frequency (RF) signals. Each converter 302–303 may convert its received BB signal to a unique television channel signal. Different channels from the different converters 302–303 can be combined at a signal combiner 304 and transmitted over the video transmission network 140. Players can access the video image associated with their game by selecting the appropriate channel on their television 114–116. The appropriate channel may be identified by a synthesized voice announcement that is communicated from the interface 132 to a telephone handset controller or by digital data sent from the interface 132 over network 150 to a controller, or may be predetermined. A television based system 100 also can allow audience members and/or other non-players to watch a game being played on the system 100 by selecting the appropriate game channel. Conversion of signals 305–306 by converters 302–303 also may be under control of a signal 135 received from the interface 132. For example, the interface 132 may send a channel selection signal to RF selection circuitry 301 which, in turn, controls the conversion channel used by each converter 302–303.

The invention may be implemented in digital electronic circuitry, or in computer hardware, firmware, software, or in combinations of them. Apparatus of the invention may be implemented in a computer program product tangibly embodied in a machine-readable storage device for execution by a programmable processor; and method steps of the invention may be performed by a programmable processor executing a program of instructions to perform functions of the invention by operating on input data and generating output. The invention may advantageously be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, specially-designed ASICs (application-specific integrated circuits).

A number of embodiments of the present invention have been described. Nevertheless, it will be understood that various modifications may be made without departing from the spirit and scope of the invention. For example, when a data connection is established between the controllers 117–119 and game server 130, the game server may request additional data from the player before a game can be played. The additional data may include, among other things, authentication, billing, payment, and security data. Accordingly, other embodiments are within the scope of the following claims.

What is claimed is:

1. A multi-player video game server comprising:
    a player data interface operatively coupling the game server to a network based on the types of connections between the network and the game server and to receive game control data over the network from a plurality of game controllers;
    a video interface coupling the game server to a video transmission network and configured to transmit game video over the video transmission network;
    game engines each coupled to the player data interface to receive game control data and coupled to the video interface to provide game video for transmission by the video interface, the game engines each further comprising a processor coupled to a memory comprising multi-player video game instructions for causing the processor to:
    receive from the player data interface the game control data from the plurality of game controllers;
    render game video as a function of the game control data from the plurality of game controllers as a plurality of subdivisions each of which is associated with different game control data; and
    output the game video to the video interface for transmission over the video transmission network, wherein the game control data and the game video are associated with a corresponding game of ongoing games.

2. The system of claim 1, wherein the player data interface comprises dual-tone multi-frequency analog telephone interface circuitry.

3. The system of claim 1 wherein the video interface comprises circuitry to simultaneously transmit different game video images to different players of a same multi-player video game comprising the video game instructions.

4. The system of claim 1 further comprising:
    a second game engine coupled to the player data interface to receive game control data associated with a second plurality of players and coupled to the video interface to provide second game video for transmission by the video interface, the second game engine further comprising second multi-player video game instructions.

5. The system of claim 4 wherein the second game engine comprises a second processor coupled to a second memory comprising the second multi-player video game instructions.

6. The system of claim 1 wherein at least one game controller comprises a telephone keypad.

7. The system of claim 1 wherein the network operatively coupled to the player data interface comprise a telephone network.

8. The system of claim 1 wherein the network operatively coupled to the player data interface and the video transmission network are different networks.

9. The system of claim 1 wherein the video interface comprises circuitry to transmit game video on a plurality of different channels.

10. The system of claim 1 wherein the network operatively couple to the player data interface comprises a packet data network.

* * * * *